Patented Nov. 28, 1933

1,936,721

UNITED STATES PATENT OFFICE 1,936,721

MANUFACTURE OF ORTHO-NITRO-PHENYL-SULPHONES

Hermann Landers, Frankfort - on - the - Main - Hochst, Germany, assignor to General Aniline Works, Inc., New York, N. Y., a corporation of Delaware No Drawing. Application March 16, 1932, Serial No. 599,360, and in Germany March 20, 1931

13 Claims. (Cl. 260—142)

The present invention relates to a new process of preparing ortho-nitrophenylsulphones and to new products obtainable thereby, more particularly it relates to a process which comprises causing a metal salt of any sulphinic acid to react with an ortho-dinitro compound of the benzene series.

The reaction is preferably carried out in the presence of a diluent or solvent while heating and takes place according to the following equation:

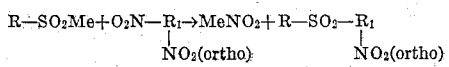

wherein R stands for any organic radical, for instance for an aliphatic-, aromatic-, hydro-aromatic, heterocylic-, aliphatic-aromatic or any other organic radical, "Me" means a metal atom and R₁ represents a radical of the benzene series.

The reaction may either be carried out by starting directly from the ready-formed metal salts of the sulphinic acids, or the condensation may be performed by using the free sulphinic acids and adding a suitable acid binding or salt-forming agent, such as sodium carbonate, potassium carbonate, the corresponding bicarbonates or acetates, calcium carbonate or any other agent of like action. Such modifications of the process are obvious equivalents and are, of course, included in the terms, as used in the specification and claims.

It may be emphasized that the new reaction is of very general application to any and all sulphinic acids, no matter whether they are of the cyclic or acyclic series and whether they are substituted or not, and to any ortho-dinitro compound of the benzene series, the number and nature of other substituents present in the organic radicals being immaterial for the reaction proper.

The ortho - nitrophenylsulphone compounds thus obtained may be transformed into the corresponding ortho-aminophenylsulphones according to known reduction methods. For many purposes it is not even necessary to isolate the nitro-compounds; the reaction mixture containing the condensation products may directly be subjected to the reduction; and even the reaction mixture obtained after the reduction may further be used directly. Thus, for instance, the solution or mixture containing the amines may be diazotized without previously isolating the amines.

A known method of preparing ortho-nitro-diaryl-sulphones consists in causing nitro-halogenaryl compounds containing an exchangeable halogen atom to react with aromatic sulphinic acids. Apart from the fact that from that reaction it could not be concluded how ortho-dinitrophenyl compounds would behave, the new reaction allows the production of a series of substituted ortho-nitro-diarylsulphones, mixed aromatic-hydroaromatic-, mixed aromatic-aliphatic-ortho-nitro-sulphones as are not accessible hitherto by other methods.

The new process has the further advantage that the reaction proceeds very smoothly and with good yields which, in many cases, surpass those obtainable by the known process.

The following examples serve to illustrate the invention but they are not intended to limit it thereto, the parts being by weight:

(1) 178 parts of the sodium salt of para-toluene-sulphinic acid are dissolved in about 150 parts of water, 168 parts of ortho-dinitrobenzene are added thereto and the whole is heated, advantageously while stirring, for some hours in an autoclave at about 130° C. whereby 2-nitro-4'-methyldiphenylsulphone of the following formula:

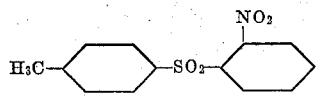

is formed. The compound is isolated in the usual manner. Its melting point lies at 156° C.–157° C. (uncorrected).

Instead of the sodium salt of para-toluene-sulphinic acid there may also be used the potassium salt or another metal salt thereof.

The 2-nitro-4'-methyldiphenylsulphone is reduced in the usual manner, for instance, by means of iron and acetic acid. The reduction may, of course, also be effected in the presence of a solvent or there may be used as reducing agent: zinc, tin, sodium sulphide, or the like. The 2-amino-4'-methyldiphenylsulphone, recrystallized from alcohol, melts at 120° C. (uncorrected melting point).

(2) 178 parts of the sodium salt of para-toluene-sulphinic acid are boiled for a short time in a reflux apparatus with 202.5 parts of 1-chloro-3.4-dintrobenzene in the presence of ethyl-alcohol. The formation of the condensation product is very soon completed. The product is filtered with suction and recrystallized from glacial acetic acid. There is obtained 5-chloro-2-nitro-4'-methyldiphenylsulphone of the following formula:

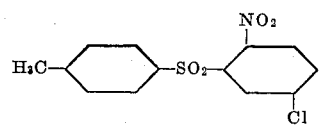

forming fine white needles of the melting point of 191° C. (uncorrected). The condensation may also be performed in the absence of a diluent by simply heating the components.

By reducing the nitro compound according to one of the known processes there is obtained 5-chloro-2-amino-4'-methyldiphenylsulphone.

(3) 216 parts of 3-methyl-4-hydroxy-5-carboxy-benzene-sulphinic acid and such a quantity of sodium carbonate as is necessary for the formation of the disodium salt are dissolved in water; to the neutral aqueous solution there are added 168 parts of ortho-dinitrobenzene and the whole is further treated as in Example 1. There is thus obtained the 2-nitro-3'-methyl-4'-hydroxy-5'-carboxy-diphenylsulphone of the following formula:

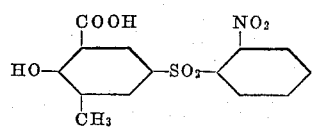

The product is isolated and may be recrystallized from water and sodium acetate. It decomposes at 226° C.–227° C. after sintering. By reduction it is transformed into 2-amino-5'-methyl-4'-hydroxy-3'-carboxy-diphenylsulphone.

(4) By replacing in Example 2 the quantity of sodium salt of para-toluene-sulphinic acid by 170 parts of the sodium salt of hexahydrobenzene-sulphinic acid there is obtained, in an analogous manner, 5-chloro-2-nitro-phenyl-hexahydrophenyl-sulphone melting at 158° C.–159° C. and corresponding to the following formula:

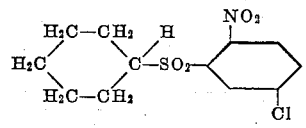

By reduction the compound is transformed into the corresponding 5-chloro-2-amino-phenyl-hexahydrophenylsulphone.

(5) A mixture of 202.5 parts of 3.4-dinitro-1-chlorobenzene and 114.5 parts of chlormethane-sulphinic acid is boiled for a short time in a reflux apparatus in the presence of sodium acetate and alcohol. The compound thus formed is isolated in the usual manner; there is obtained the sulphone of the following formula:

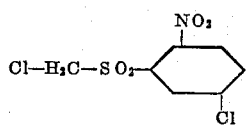

(6) By causing a suitable metal salt of para-chlorbenzene-sulphinic acid to react with ortho-dinitrobenzene there is obtained 2-nitro-4'-chlor-diphenylsulphone of the formula:

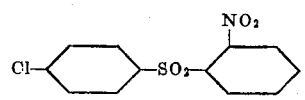

The purified compound melts at 137° C.–138° C.

In an analogous manner there may be obtained the compound

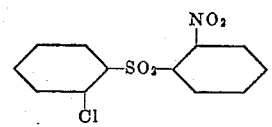

which melts at 153° C.

(7) By substituting in Example 2 for 1-chloro-3.4-dinitro-benzene the equimolecular quantity of 1.2-dichloro-4.5-dinitro-benzene, there is obtained in an analogous manner 4.5-dichloro-2-nitro-4'-methyldiphenylsulphone of the formula:

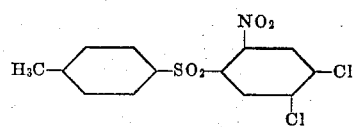

melting at 167° C.

(8) The condensation of the sodium salt of para-methoxy-benzene-sulphinic acid with ortho-dinitrobenzene yields 2-nitro-4'-methoxy-diphenylsulphone of the formula:

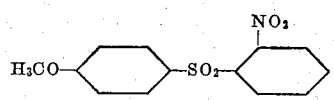

melting at 149.5° C.

Instead of the sulphinic acids used in the preceding examples any other sulphinic acids may be used, for instance, the following:

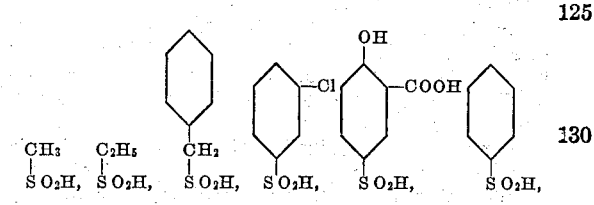

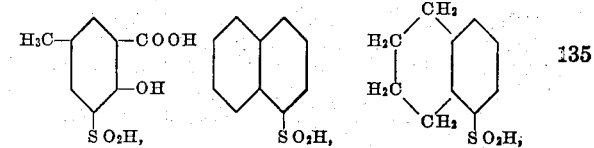

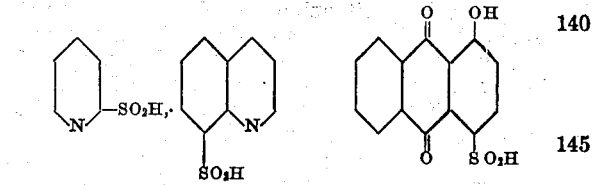

or the like.

Likewise, the ortho-dinitrobenzene compounds used may be replaced by others as, for instance, the following:

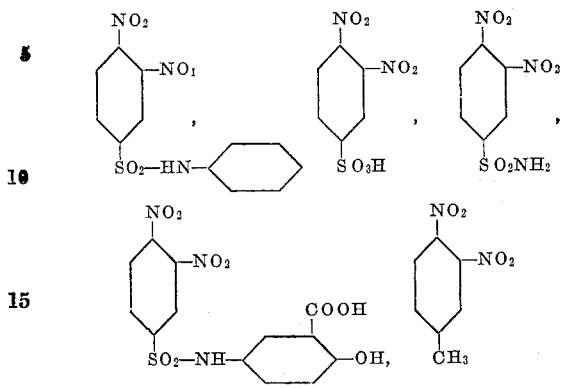

or the like. The condensation methods may, of course, be varied largely. Thus, for instance, the sodium salts of the sulphinic acids may be replaced by other salts thereof; or the condensation may be performed in the presence of calcium carbonate or other salt-forming agents. Instead of water and alcohol there may be used other diluents as, for instance, hydrocarbons.

I claim:

1. The process which comprises heating a sulphinic acid with an ortho-dinitro compound of the benzene series in the presence of an agent of the group consisting of acid-binding and salt-forming substances.

2. The process which comprises heating a metal salt of a sulphinic acid with an ortho-dinitro compound of the benzene series.

3. The process which comprises heating a metal salt of a sulphinic acid with an ortho-dinitro compound of the benzene series in the presence of an inert liquid diluent.

4. The process which comprises heating an alkali metal salt of a sulphinic acid with an ortho-dinitro compound of the benzene series in the presence of an inert liquid diluent.

5. The process which comprises heating an alkali metal salt of a sulphinic acid with an ortho-dinitro compound of the benzene series in the presence of water.

6. The process which comprises heating an aqueous solution of the sodium salt of para-toluene-sulphinic acid with ortho-dinitrobenzene in an autoclave at a temperature of about 130° C.

7. The process which comprises boiling a mixture of the sodium salt of para-toluene-sulphinic acid and 1-chloro-3.4-dinitrobenzene in the presence of alcohol.

8. The process which comprises boiling a mixture of chloro-methane-sulphinic acid and 1-chloro-3.4-dinitro-benzene in the presence of sodium acetate and alcohol.

9. The compounds of the general formula:

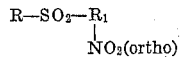

wherein R stands for a radical of the group consisting of halogenalkyl, alkyl containing at least two carbon atoms, aralkyl, radicals of the benzene series being substituted by alkyl, alkoxy or halogen, di- and poly-nuclear aromatic radicals, hydroaromatic radicals and heterocyclic radicals, and wherein $R_1$ represents a radical of the benzene series, said compounds being crystalline substances and yielding on reduction the corresponding amino compounds.

10. The compounds of the general formula:

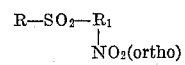

wherein R stands for a benzene radical being substituted by methyl, chlorine or methoxy or for a cyclohexyl radical, and $R_1$ represents a radical of the benzene series, said compounds being crystalline substances and yielding on reduction the corresponding amino compounds.

11. The compounds of the general formula:

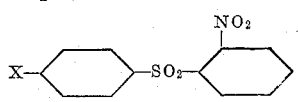

wherein X stands for methyl, chlorine or methoxy, said compounds being crystalline substances and yielding on reduction the corresponding amino-compounds.

12. The compounds of the general formula:

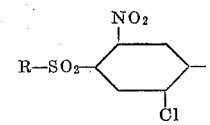

wherein R stands for a radical of the group consisting of

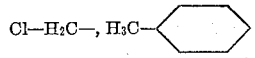

and

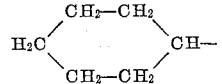

said compounds being crystalline substances and yielding on reduction the corresponding amino compounds.

13. The compound of the formula:

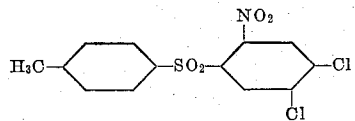

having a melting point of 167° C.

HERMANN LANDERS.